(12) United States Patent
Kamada

(10) Patent No.: US 8,377,179 B2
(45) Date of Patent: Feb. 19, 2013

(54) MOISTURE CONTROL MODULE, PROCESS FOR PRODUCING THE MOISTURE CONTROL MODULE, AND APPARATUS FOR PRODUCING THE MOISTURE CONTROL MODULE

(75) Inventor: Masato Kamada, Chiba (JP)

(73) Assignee: AGC Engineering Co., Ltd., Chiba-shi (JP)

( * ) Notice: Subject to any disclaimer, the term of this patent is extended or adjusted under 35 U.S.C. 154(b) by 347 days.

(21) Appl. No.: 12/856,124

(22) Filed: Aug. 13, 2010

(65) Prior Publication Data

US 2011/0036916 A1 Feb. 17, 2011

(30) Foreign Application Priority Data

Aug. 17, 2009 (JP) .................................. 2009-188686

(51) Int. Cl.
*B01D 53/22* (2006.01)
*B32B 37/02* (2006.01)

(52) U.S. Cl. ............... 96/10; 96/4; 96/11; 95/45; 95/52; 156/293; 156/294; 156/423; 156/556; 156/583.1; 236/44 A

(58) Field of Classification Search ............... 96/4, 10, 96/11; 95/45, 52; 156/60, 293, 294, 391, 156/423, 538, 556, 583.1; 236/44 A
See application file for complete search history.

(56) References Cited

U.S. PATENT DOCUMENTS

| | | | | |
|---|---|---|---|---|
| 3,196,194 A * | 7/1965 | Ely, Jr. et al. | ................. | 264/558 |
| 3,547,272 A * | 12/1970 | Kalish et al. | ............. | 210/321.87 |
| 4,705,543 A | 11/1987 | Kertzman | | |
| 4,808,201 A | 2/1989 | Kertzman | | |
| 4,950,347 A * | 8/1990 | Futagawa | ...................... | 156/293 |
| 6,673,440 B2 * | 1/2004 | Douglas et al. | ............... | 156/293 |
| 6,779,522 B2 * | 8/2004 | Smith et al. | ............. | 128/203.16 |
| 7,291,240 B2 * | 11/2007 | Smith et al. | ................... | 156/195 |

\* cited by examiner

*Primary Examiner* — Jason M Greene
(74) *Attorney, Agent, or Firm* — Oblon, Spivak, McClelland, Maier & Neustadt, L.L.P.

(57) ABSTRACT

To provide a moisture control module which has a function to reduce or increase moisture in a gas permitted to flow in a hollow fiber and which is substantially free from air leakage and easy to produce; a process for producing such a moisture control module; and an apparatus for producing such a moisture control module. A moisture control module comprising a tubular hollow fiber 1, a braid fiber 3 plaited into a braid to cover the exterior of the hollow fiber 1, and a pipe 5 inserted in an end of the hollow fiber 1, wherein as the hollow fiber 1 and the braid fiber 3 present in a region with a prescribed length from said end have been heated at a prescribed temperature from outside, the braid fiber 3 is fused, and at the same time, the hollow fiber 1 is fixed by heat shrinkage to the pipe 5.

5 Claims, 16 Drawing Sheets

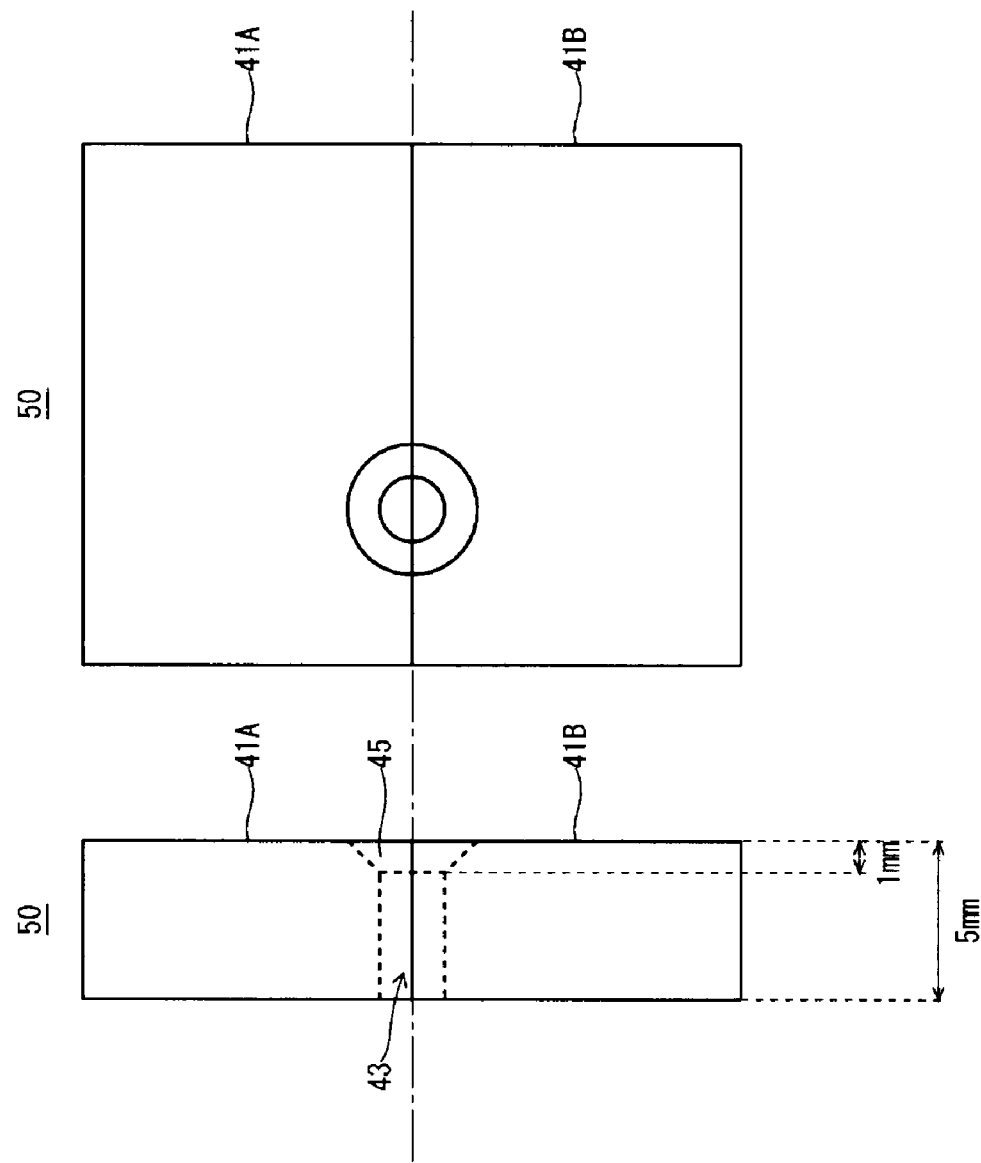

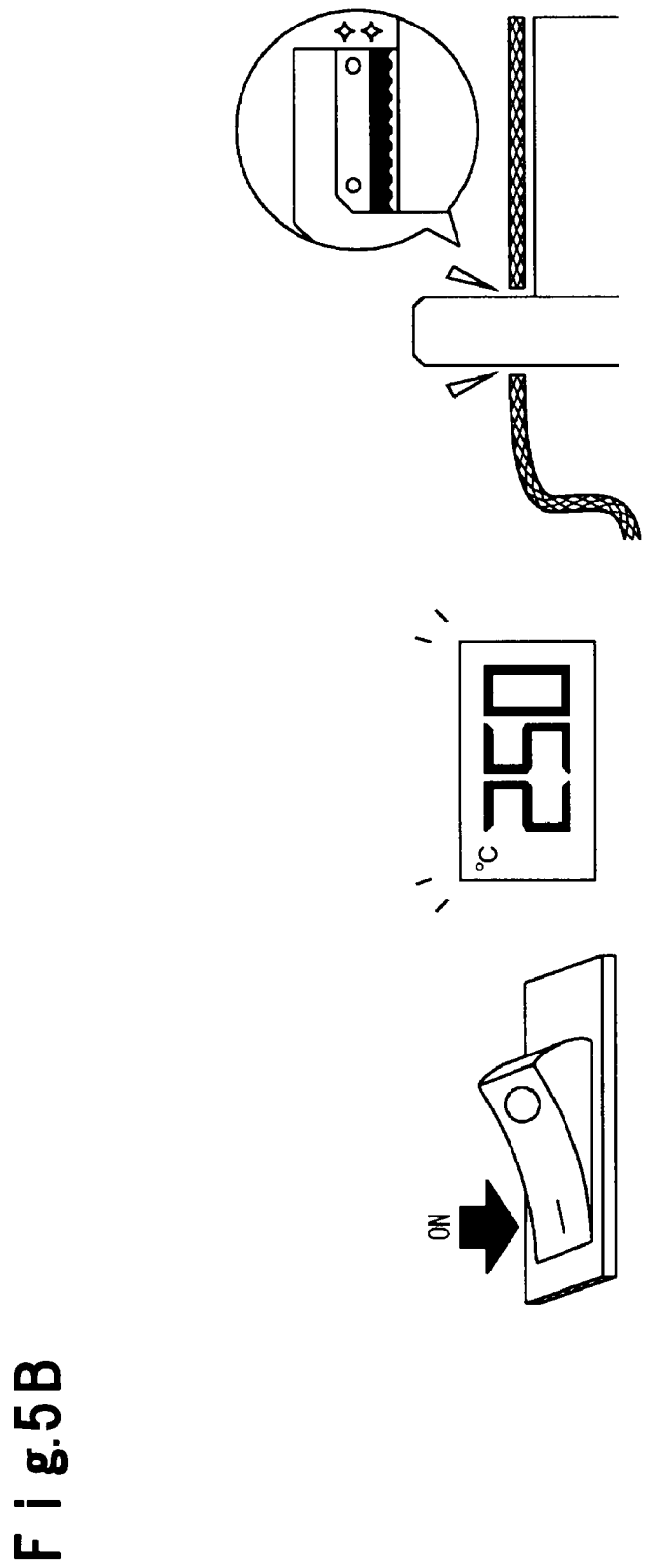

Fig.5C
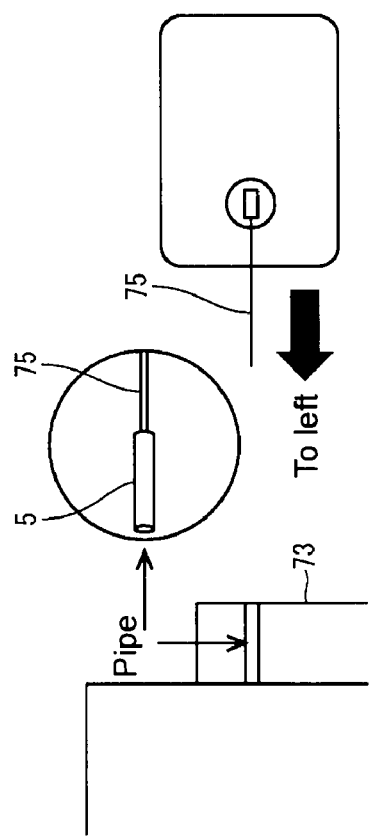
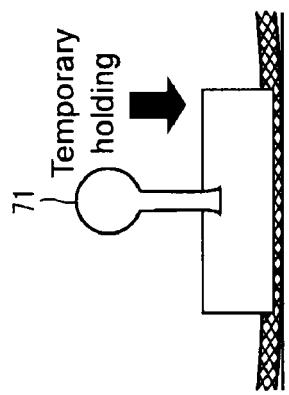

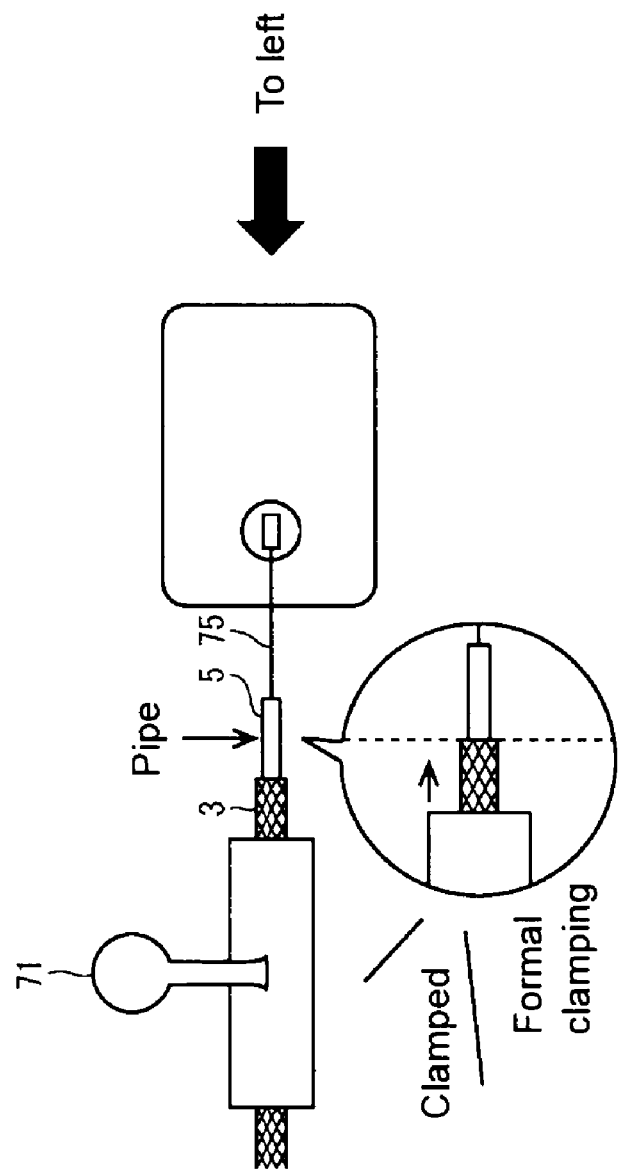

MOISTURE CONTROL MODULE, PROCESS FOR PRODUCING THE MOISTURE CONTROL MODULE, AND APPARATUS FOR PRODUCING THE MOISTURE CONTROL MODULE

BACKGROUND OF THE INVENTION

1. Field of the Invention

The present invention relates to a moisture control module, a process for producing the moisture control module, and an apparatus for producing the moisture control module, particularly to a moisture control module which has a function to reduce or increase moisture in a gas permitted to flow in a hollow fiber and which is substantially free from air leakage and easy to produce, a process for producing such a moisture control module, and an apparatus for producing such a moisture control module.

2. Discussion of Background

Heretofore, for the purpose of e.g. measuring the concentration of carbon dioxide gas contained in human breath, a moisture control module has been used for a carbon dioxide gas analyzer. By removing moisture in the carbon dioxide gas by such a moisture control module, it becomes possible to measure the concentration with high precision. A schematic view of such a moisture control module 10 is shown in FIG. 9.

In FIG. 9, a hollow fiber 1 is formed in a tubular form so that a gas is permitted to flow through its center. And, on the exterior of this hollow fiber 1, a braid fiber 3 made of a resin and plaited into a braid is mounted. And, such a hollow fiber 1 and a braid fiber 3 are cut in a necessary length. The inner diameter of the hollow fiber 1 is preferably from 1.0 to 2.5 mm, more preferably from 1.0 to 1.5 mm. On the other hand, its outer diameter is preferably from 1.3 to 3.0 mm, more preferably from 1.3 to 1.8 mm.

Inside of the hollow fiber 1, a pipe 5 is inserted in the hollow fiber 1 so that it is projected in a prescribed length from the end of the hollow fiber 1 and braid fiber 3. The end of the hollow fiber 1 and braid fiber 3, and the circumference of the pipe 5, are integrally molded with a resin material by a joint structure 7 (this structure is described in detail, for example, in Patent Documents 1 and 2).

Patent Document 1: U.S. Pat. No. 4,705,543
Patent Document 2: U.S. Pat. No. 4,808,201

With such a conventional moisture-control module 10, if the end of the braid fiber 3 is left to be non-treated, the fiber gets frayed simply by being touched. Further, when the joint structure 7 was molded by a mold, the fiber frayed from the braid fiber 3 was likely to stick out from the mold and thus cause a molding defect.

Further, in a state where the pipe 5 is inserted in the hollow fiber 1, the pipe 5 is free to move because of existence of a space. Even when the joint structure 7 was formed by integral molding with the resin material, if a space existed, air leakage was likely to result, thus leading to a production defect.

SUMMARY OF THE INVENTION

The present invention has been made in view of such conventional problems, and it is an object of the present invention to provide a moisture control module which has a function to reduce or increase moisture in a gas permitted to flow in a hollow fiber and which is substantially free from air leakage and easy to produce, a process for producing such a moisture control module, and an apparatus for producing such a moisture control module.

Accordingly, the moisture control module of the present invention comprises a tubular hollow fiber, a braid fiber plaited into a braid to cover the exterior of the hollow fiber, and a pipe inserted in an end of the hollow fiber, wherein as the hollow fiber and the braid fiber present in a region with a prescribed length from said end have been heated at a prescribed temperature from outside, the braid fiber is fused, and at the same time, the hollow fiber is fixed by heat shrinkage to the pipe.

By such heating, with respect to the braid fiber, fraying can be prevented by fusion, and at the same time, with respect to the hollow fiber, it is possible to fix it to the pipe by head shrinkage.

Further, the moisture control module of the present invention is provided with a joint formed to cover the respective ends of the pipe, the hollow fiber and the braid fiber.

Further, the moisture control module of the present invention is characterized in that the prescribed temperature is from 150° C. to 180° C.

In a case where a usual fluororesin is selected for the hollow fiber and nylon or ester fiber is selected for the braid fiber, if the temperature exceeds 180° C., the fibers are likely to be completely melted, such being undesirable. On the other hand, the temperature at which heat shrinkage of the fluororesin can be expected by heating, is at least 150° C. Thus, it is preferred to carry out the heating at a temperature of from 150° C. to 180° C., at which fusion of the braid fiber can be expected, and heat shrinkage of the hollow fiber can be expected. More preferred is a temperature range of from 160° C. to 170° C.

Further, the process for producing a moisture control module according to the present invention comprises combining a tubular hollow fiber and a braid fiber plaited into a braid to cover the exterior of the hollow fiber; inserting a pipe to an end of the hollow fiber from outside along the axis of the hollow fiber so that a part of the pipe is left to remain outside; and while applying a heat of a prescribed temperature to a region with a prescribed length of the braid fiber from the end by pressing the braid fiber by a heater press, passing the braid fiber through a hole having its diameter gradually or stepwise flared towards the axis direction of the heater press, so that the braid fiber is fused, and at the same time, the hollow fiber is fixed by heat shrinkage to the pipe.

It is thereby possible to produce a moisture control module simply and in a short time.

Further, the apparatus for producing a moisture control module according to the present invention comprises a clamp for clamping a braid fiber plaited into a braid around a tubular hollow fiber; a pipe-inserting means for inserting a pipe to the hollow fiber fixed by clamping by the clamp, from outside along the axis of the hollow fiber so that a part of the pipe is left to remain outside; and a heater press means for heating, while uniformly pressing from circumference, a region with a prescribed length from an end of the braid fiber by letting the region pass through a hole having its diameter gradually or stepwise flared towards the axis direction.

As described above, according to the present invention, the hollow fiber and the braid fiber present in a region with a prescribed length from the end are heated at a prescribed temperature from outside, whereby by such heating, with respect to the braid fiber, fraying can be prevented by fusion, and with respect to the hollow fiber, it is possible to fix it to the pipe by heat shrinkage.

BRIEF DESCRIPTION OF THE DRAWINGS

FIG. 4 is a schematic view of a heater press.

FIG. 5B is a view illustrating a step for producing a moisture control module (step 2).

FIG. 5C is a view illustrating a step for producing a moisture control module (step 3).

FIG. 5D is a view illustrating a step for producing a moisture control module (step 4).

Figure 1:
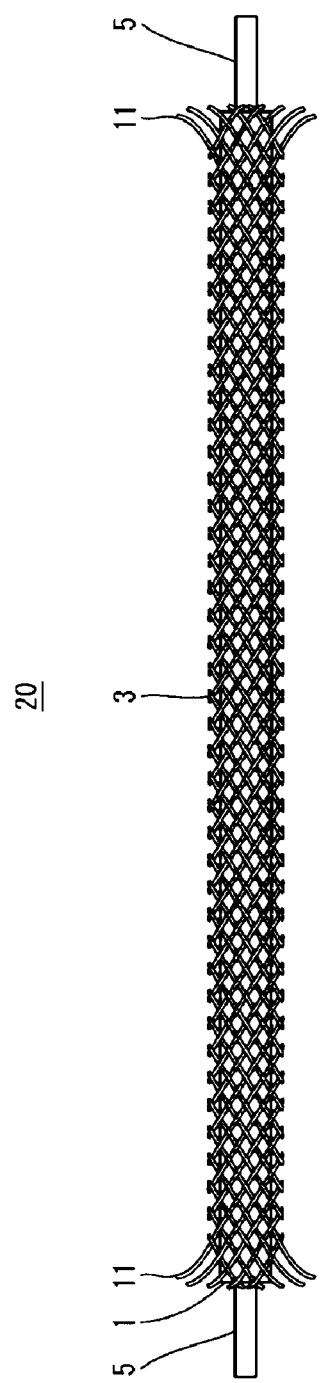
FIG. 1 shows a construction of a moisture control module prior to heat fusion and prior to molding.

In the drawings, reference numerals have the following meanings:

1: hollow fiber
3: braid fiber
5: pipe
7: joint
11: fraying at an end of braid fiber
20, 30, 40: moisture control module
41A: upper heater
41B: lower heater
43: through-hole
45: flared portion
50: heater press
60: heating section
70: stage
71: clamp
73: pipe receptor
75: set pin
83: lever
85: tube stage

DETAILED DESCRIPTION OF THE PREFERRED EMBODIMENT

Now, a preferred embodiment of the present invention will be described. Schematic views of the embodiment of the present invention are shown in FIGS. 1 to 8. Here, the same elements as in FIG. 9 will be identified by the same symbols, and their description will be omitted.

Figure 2:
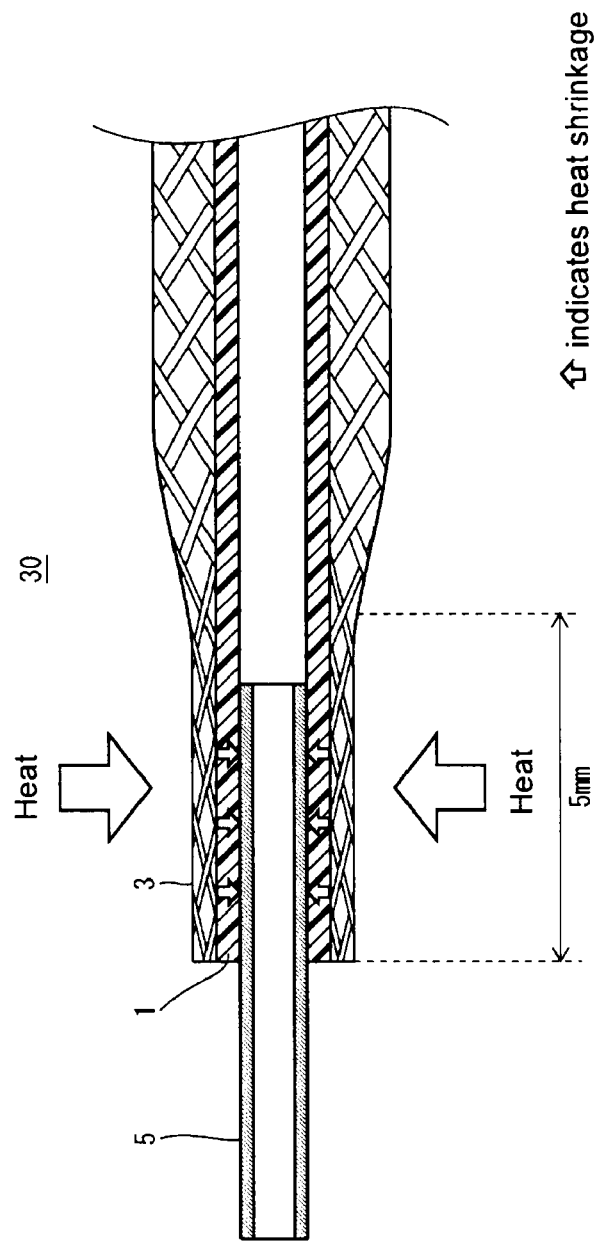
FIG. 2 shows a construction of a moisture control module after heat fusion and before molding.

This embodiment is one wherein a heat is applied to the end of a braid fiber and a hollow fiber wherein a pipe is inserted, so that the hollow fiber is press-bonded to the tube without a space and not to be loose, and at the same time the end of the braid fiber is fused to itself and to the hollow fiber by heat not to be frayed. FIG. 1 shows a structure of a moisture control module before heat fusion and before molding. On the other hand, FIG. 2 shows a structure of the moisture control module after heat fusion and before molding.

In the moisture control module 20 in FIG. 1, a hollow fiber 1 is preliminarily inserted in a braid fiber 3 and both ends of the braid fiber 3 and hollow fiber 1 are cut to leave a necessary length. And, a pipe 5 is inserted in the hollow fiber 1 for a prescribed length, and the rest is protruded from the end of the hollow fiber 1. When cut in a necessary length, at the end of the braid fiber 3, the braid is raveled to cause fraying 11. And, the pipe 5 inserted in the hollow fiber 1 is in such a state that it is free to move.

The hollow fiber 1 may be in the form of a porous membrane or a non-porous membrane.

Further, the material for the hollow fiber 1 is not particularly limited so long as it is heat shrinkable, but it is preferably a fluororesin, particularly preferably a fluorinated ion exchange resin.

The fluorinated ion exchange resin is preferably a copolymer comprising repeating units based on tetrafluoroethylene (hereinafter referred to as TFE) and repeating units having an ion exchange group, particularly preferably a copolymer comprising repeating units based on TFE and repeating units based on a perfluorovinyl ether having a sulfonic acid group. The repeating units based on a perfluorovinyl ether having a sulfonic acid group are usually formed by copolymerizing TFE with a perfluorovinyl ether monomer having a $SO_2F$ group and then converting the $SO_2F$ groups in the copolymer to sulfonic acid groups. Further, the braid fiber 3 is selected to be one which is formed, for example, from nylon or an ester fiber and which has a softening temperature (melting temperature) lower than the resin constituting the hollow fiber 1.

Further, the outer diameter of the pipe 5 is smaller by from 0.1 to 0.25 mm than the inner diameter of the hollow fiber 1, and the material for the pipe is selected to have a strength durable against heat shrinkage of the hollow fiber 1 made of a fluororesin tube and to be hardly corroded by such a fluororesin tube. For example, it is formed of a pipe made of a metal such as stainless steel or a nickel alloy.

The outer diameter of the pipe 5 is preferably smaller by from 0.1 to 0.25 mm than the inner diameter of the hollow fiber 1 from the viewpoint of efficiency for insertion, and it is preferably larger by from 0.03 to 0.05 mm than the inner diameter of the hollow fiber 1 from such a viewpoint that the obtained tube is free from wrinkles.

In FIG. 2, an end of the braid fiber 3 is treated by applying a heat on the circumference within 5 mm from the end of the braid fiber 3, so that yarns of the braid fiber 3 are fused to one another. Such fused yarns are also fused to the hollow fiber 1. Further, the hollow fiber 1 undergoes heat shrinkage by the heat applied from outside, so that it is fixed to the pipe 5.

Figure 3:
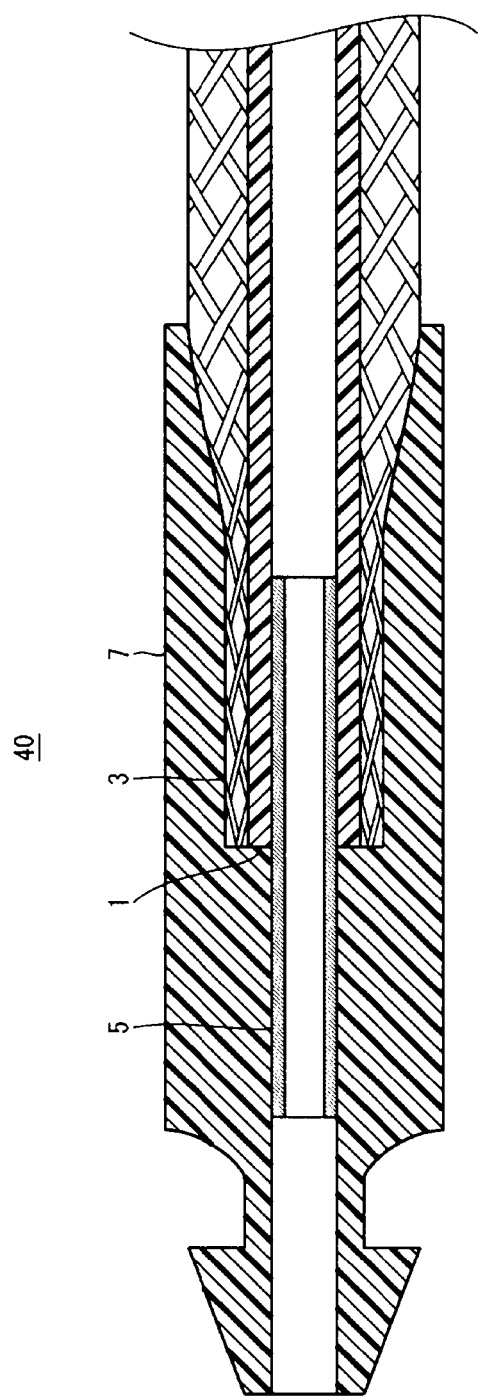
FIG. 3 shows a product prepared by casting a resin material to both ends of a moisture control module to integrally mold it as a joint.

A moisture control module 40 in FIG. 3 is one prepared by casting a resin material to both ends of the moisture control module 30 constructed in FIG. 2, by a mold not shown and integrally molding it as a joint.

In such a construction, a heat is applied to the circumference within 5 mm from the end of the braid fiber 3. Such 5 mm is prescribed in that the inserted pipe 5 is present in a region of such 5 mm from the end, and fraying of the braid fiber 3 is also observed in this area. By such heating, with respect to the braid fiber 3, fraying can be prevented by the fusion, and with respect to the hollow fiber 1, it is possible to fix it by heat shrinkage to the pipe 5.

Here, the melting temperature of the fluororesin is at least 200° C. Whereas, the fusion temperature of the braid fiber 3, when nylon or ester fiber is selected for use, is lower than the melting temperature, i.e. at a level of from 170° C. to 180° C. Here, more than 180° C. is not desirable, since the yarns will thereby be completely melted.

On the other hand, the temperature at which heat shrinkage of a usual fluororesin is expected by heating, is at least 150° C. Accordingly, it is desirable to carry out the heating at a temperature of from 150 to 180° C. at which fusion of the braid fiber 3 can be expected, and heat shrinkage of the hollow fiber 1 can also be expected. More preferred is a range of from 160° C. to 170° C.

By applying a heat within this range to the circumference within 5 mm from the end of the braid fiber 3, it is possible to attain fusion to prevent fraying of the braid fiber 3, and at the same time as this fusion, it is possible to fix the hollow fiber 1 to the pipe 5 by heat shrinkage.

Further, at the time of such heating, in order to sufficiently prevent fraying of the braid fiber 3, the following pressing step during the heating is further added. Such pressing step during the heating will be described with reference to the schematic view of a heater press in FIG. 4.

As shown in FIG. 4, the heater press 50 is constituted by an upper heater 41A and a lower heater 41B both heated at a temperature of from 160° C. to 170° C. and constructed so that the respective heaters are freely opened or closed in a vertical direction by an operation of a lever not shown. FIG. 4 shows a state where the upper heater 41A and the lower heater 41B are closed.

The bottom surface of the upper heater 41A and the upper surface of the lower heater 41B are, respectively, grooved in a semicircular shape so that a through hole 43 will be formed when they are closed. This semicircle is flared from a position of 1 mm from the right end surface in the FIG. towards the right hand direction, so that a trumpet-shaped flared portion 45 will be formed when they are closed.

And, the through hole 43 is formed so that its diameter is slightly smaller than the diameter of the braid fiber 3. The bottom surface of the upper heater 41A, the upper surface of the lower heater 41B and the respective surfaces of the through hole 43 and flared portion 45 are provided with a polytetrafluoroethylene resin coating.

Here, each of the upper heater 41A and the lower heater 41B is formed to have a thickness of 5 mm.

In such a construction, the moisture control module 20 is tucked into the through hole 43 and flared portion 45 of the heater press 50 so that the pipe 5 is located on the right-hand side. While heating in this state at the above described temperature for about 25 to 27 seconds, the moisture control module 20 is pulled to the left-hand side direction, whereby frayed yarns at the right-hand end of the moisture control module 20 are pressed and shrink as they pass through the gradually narrowing flared portion 45 and the narrow through hole 43 portion, and thus it is possible to increase the fusion area among the yarns to one another. Accordingly, it is possible to prevent fraying.

Heating is efficiently and certainly conducted to the hollow fiber 1 by heat conduction via the adhered braid fiber 3. Therefore, its fixing by shrinkage to the pipe 5 can be certainly carried out. The shape of the flared portion 45 may not be tapered but may be stepwise.

Now, other methods (examples of failure) which the present inventors have conducted until they have arrived at the present embodiment, and problems involved in such methods will be described in detail for the purpose of comparison with the process for producing a moisture control module by heating in the present embodiment. The following methods (1) to (4) are examples which were all not successful because of certain problems involved therein.

(1) A hollow fiber 1 having a braid fiber 3 plaited thereon, is cut in a length of 70 mm. While the end of the braid fiber 3 is in a frayed state, the hollow fiber 1 is dipped and swelled in pure water or ethanol. When the internal diameter has increased, a metal pipe 5 is inserted. Then, the hollow fiber 1 is dried in a constant temperature tank.

However, by this method, at the temperature (50° C.) of the constant temperature tank, the braid fiber 3 radially spreaded, and the braid fiber 3 stuck out from the mold of the molding machine, whereby molding defects were frequented, and a non-moldable component was resulted.

(2) A hollow fiber 1 having a braid fiber 3 plaited thereon, is cut in a length of 70 mm. While the end of the braided fiber 3 is in a frayed state, the hollow fiber 1 is dipped and swelled in pure water or ethanol. When the internal diameter has increased, a metal pipe 5 is inserted. As is different from the above (1), in this method (2), the hollow fiber 1 was dried at room temperature. On appearance, the hollow fiber 1 appeared to have fixed by shrinkage to the metal pipe 5.

Then, this moisture control module is set in a resin mold. In a resin (polypropylene) molding machine, the end portion is molded into a joint shape to finish into a tube dryer for exhaled gas. A set pin which meets the inner diameter of the metal pipe 5 is fitted into the pipe to prevent the resin from flowing into the hollow fiber 1.

However, by this method, it is necessary to set the module in the mold while being careful not to touch the braid fiber 3 with a hand to prevent radial spreading, whereby the yield of the molded product decreased to a level of 50% or less.

Further, the finish of the join portion after molding was poor in that on appearance, the braid fiber 3 was frayed in every direction in the resin joint portion.

Then, the air sealing performance of the molded portion was measured by using a leak tester. As the measuring conditions, a joint portion on one side was closed, and then a pressure of 0.07 MPa was injected from the other joint portion side. A leaked amount of not more than 0.3 mL/min. was regarded as "acceptable". By this method, all were found to be not acceptable.

(3) In the production process at the heating section as described in detail hereinafter, a lever of a heater press 50 is raised to vertically open the heater press 50. A freely movable after-mentioned tube stage 85 is moved to the heater press 50 in a state where the braid fiber 3 and the hollow fiber 1 are clamped. While heating in a state where the braid fiber 3 is clamped by lowering the lever of the heater press 50, the tube state 85 is moved to the left-hand side.

If the structure of the heater press 50 is a cylindrical shape close to the outer diameter of the braid fiber 3 and it is provided with the through hole 43 without the flared portion 45, a space will be formed after the heat fusion of the braid fiber 3. A heat was not conducted by the space, and the braid fiber 3 was frayed into 16 yarns by failure of heat fusion.

(4) In the production process at the heating section, a braid fiber 3 and a hollow fiber 1 are temporarily held by a clamp. A metal pipe 5 is placed in a pipe receptor. A set pin is moved and inserted into the metal pipe 5. The set pin as inserted in the metal pipe 5 is moved to left to a controlled position to the hollow fiber 1 temporarily held by the clamp thereby to insert the metal pipe 5 into the hollow fiber 1. The forward end of the braid fiber 3 and hollow fiber 1 is adjusted by sliding to a predetermined position, following by formal clamping.

In such a state that the set pin is inserted, a lever of the heater press 50 is raised to open the heater press vertically. A tube stage 85 is moved to a heater press 50. A lever of the heater press 50 is lowered to clamp the braid fiber 3.

While heating in such a state, the tube stage 85 is moved to the left hand side.

When the heating was conducted in such a state that the set pin was inserted into the pipe 5, the heat was conducted to the set pin, whereby the braid fiber 3 failed in heat fusion and was frayed into 16 yarns.

Now, the process for producing a moisture control module in the present embodiment which has been completed to overcome the problems involved in the above described methods (1) to (4), will be described. In the following, the steps for producing the moisture control module will be described with reference to the drawings.

Figure 5A:
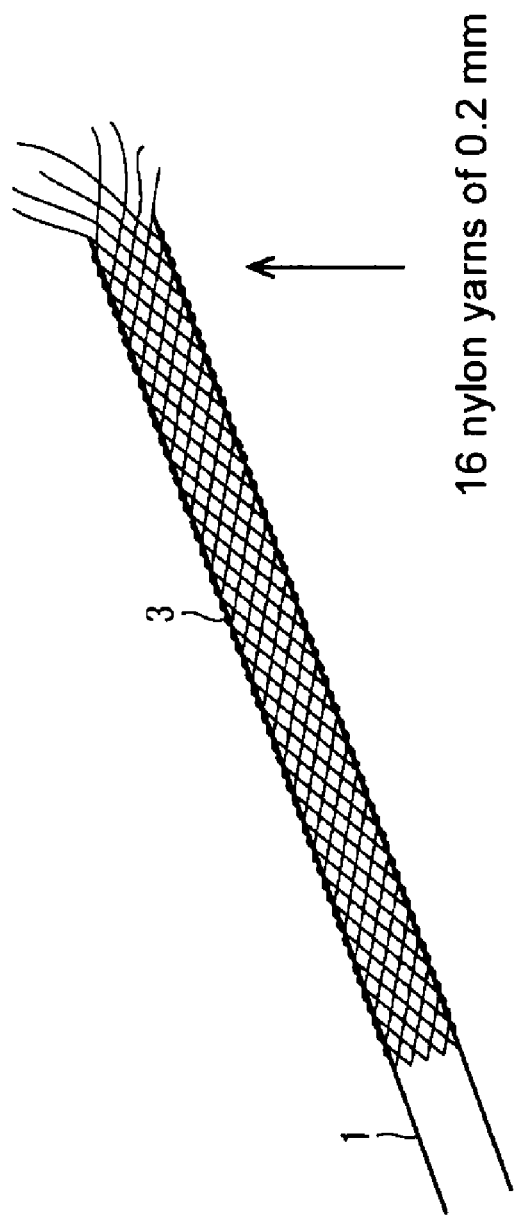
FIG. 5A is a view illustrating a step for producing a moisture control module (step 1).

(1) In FIG. 5A, by using 16 nylon yarns having a diameter of 0.2 mm, a braid fiber 3 is formed on the exterior of the hollow fiber 1.

(2) In FIG. 5B, a power source for a heating section 60 is switched on to heat the heater, and the temperature of a temperature sensor is set at 250° C. The braid fiber 3 and the hollow fiber 1 are set and cut in a length of 70 mm.

The heater temperature of the upper heater 41A and lower heater 41B portions for heat fusion is set to be from 160 to 170° C.

(3) In FIG. 5C, the braid fiber 3 and the hollow fiber 1 are temporarily held by a clamp 71. A metal pipe 5 is placed on a pipe receptor 73. As shown in a stage overview in FIG. 6, the set pin 75 is moved along a guide rail 77 disposed on a stage 70 and inserted into the metal pipe 5. It is moved on the stage 70 as inserted in the metal pipe 5.

Figure 7:
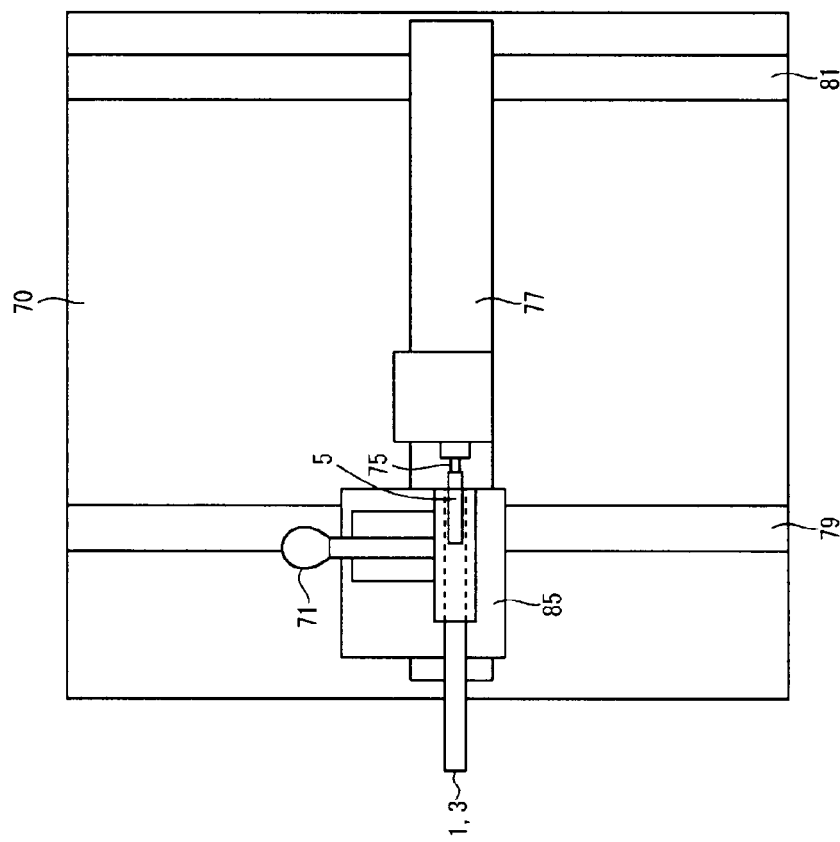
FIG. 7 is a stage overview (stage 2).

(4) In FIGS. 5D and 7, the set pin 75 is moved to left to a controlled position to the hollow fiber 1 temporarily held by the clamp 71, and the metal pipe 5 is inserted into the hollow fiber 1. The forward end of the braid fiber 3 and hollow fiber 1 is adjusted by sliding to a predetermined position, followed by formal clamping by the clamp 71.

Figure 5E:
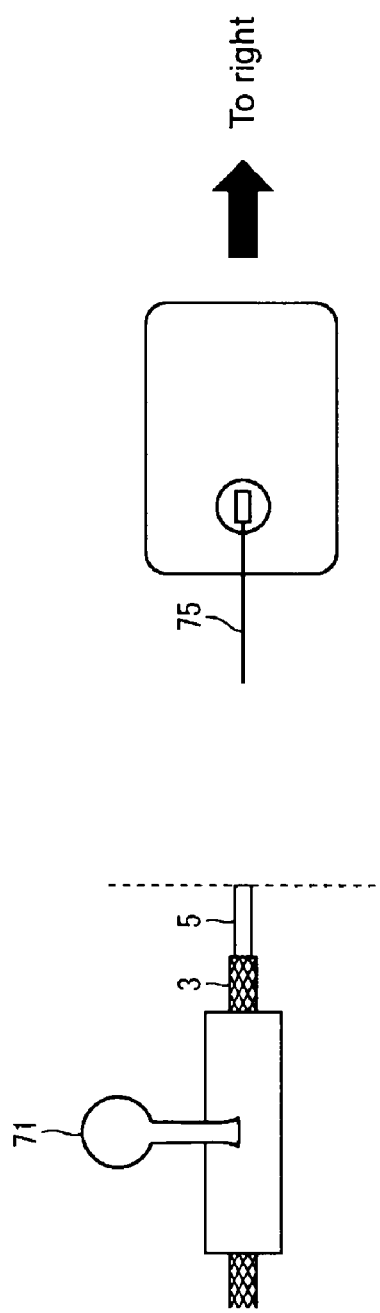
FIG. 5E is a view illustrating a step for producing a moisture control module (step 5).
Figure 8:
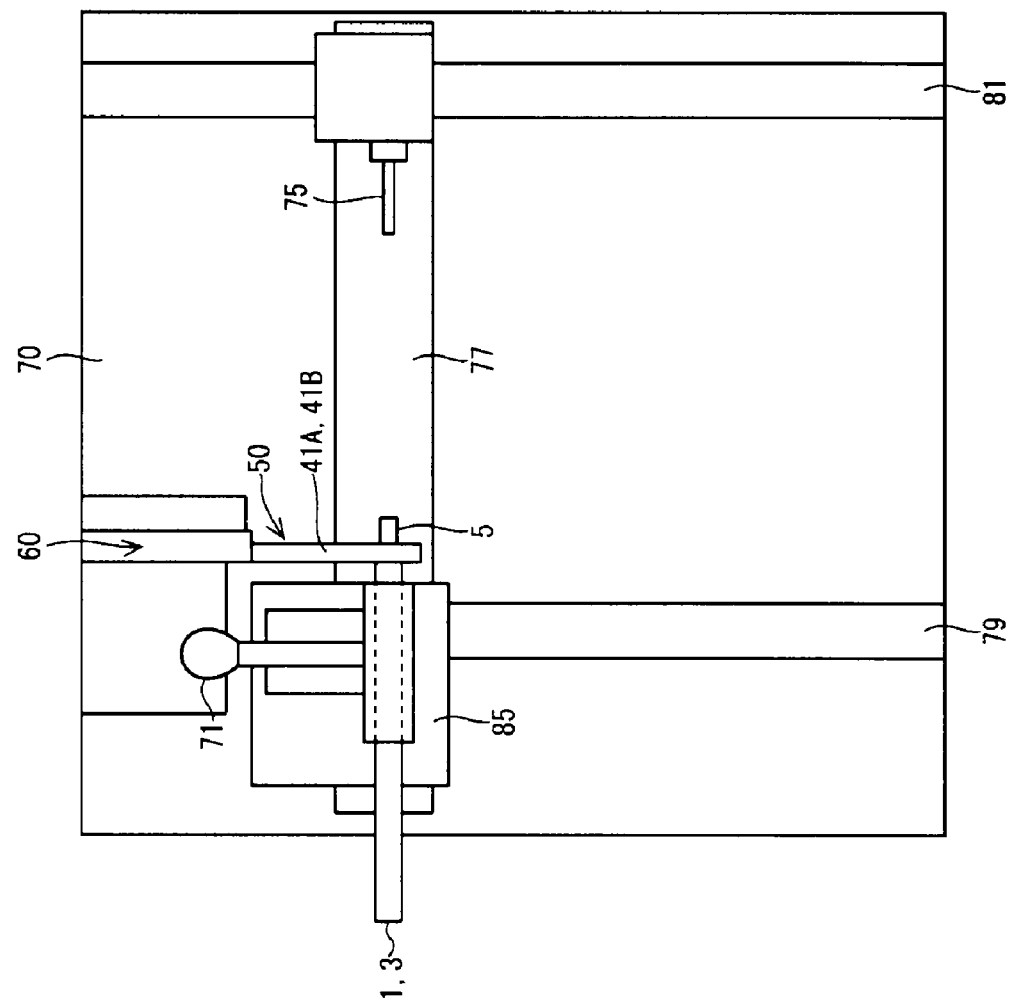
FIG. 8 is a stage overview (stage 3).
Figure 9:
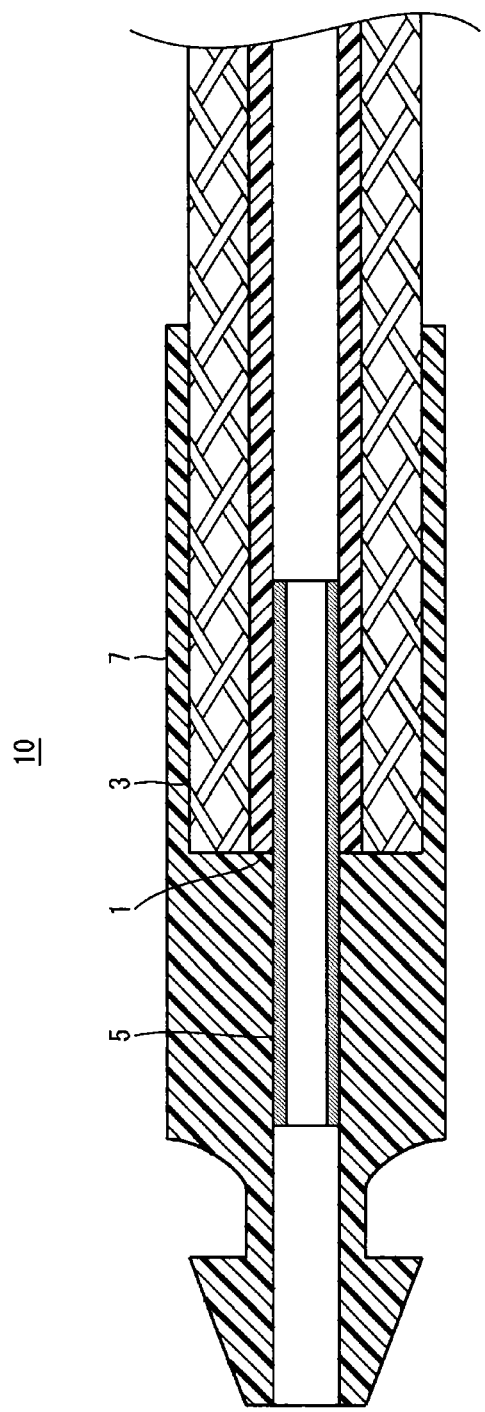
FIG. 9 shows a schematic view of a conventional moisture control module.

(5) As shown in FIGS. 5E and 8, the set pin 75 is moved to right, whereby the metal tube 5 remains in the hollow fiber 1 as projected for a prescribed length.

Figure 5F:
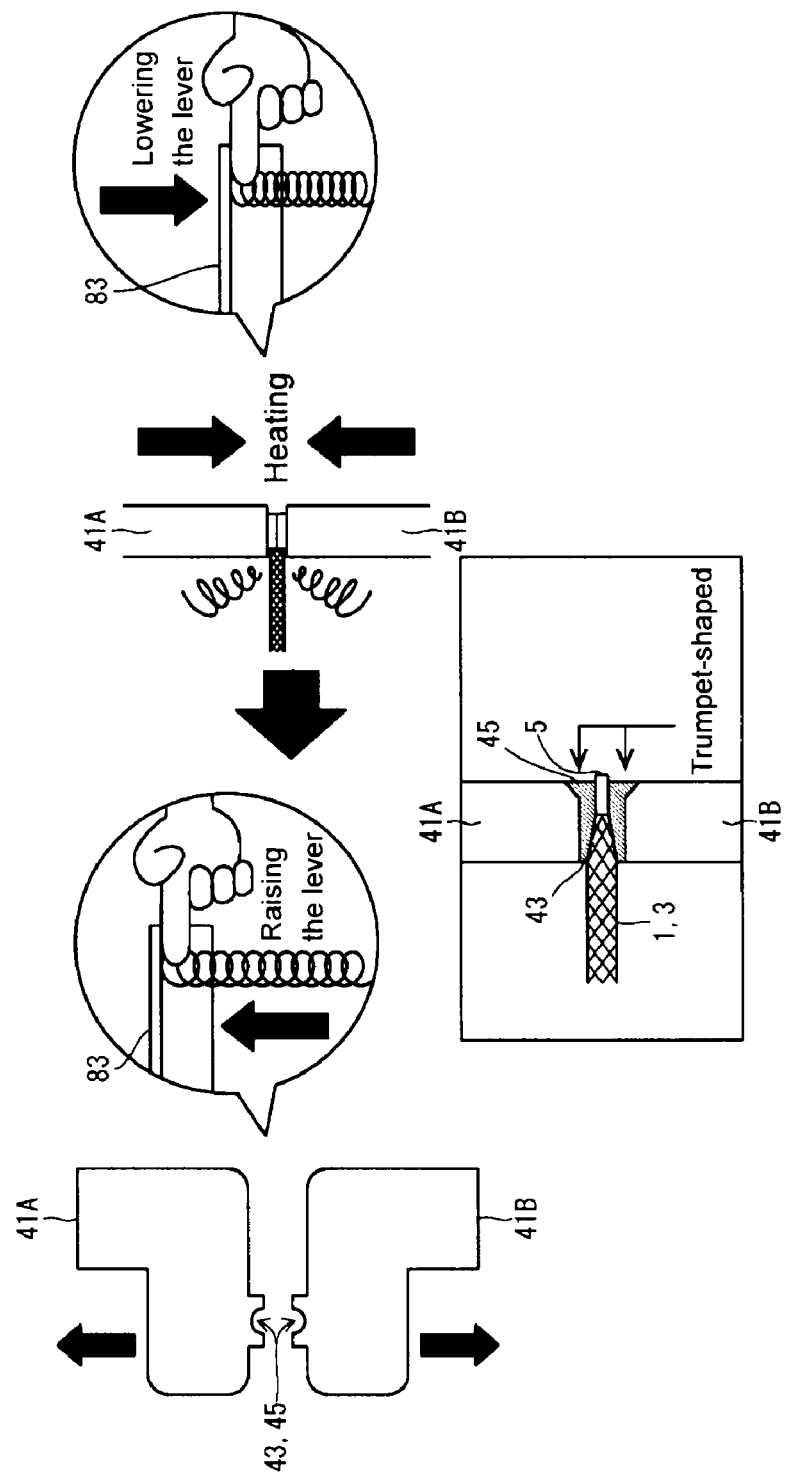
FIG. 5F is a view illustrating a step for producing a moisture control module (step 6).

(6) In FIG. 5F, a lever 83 of a heater press 50 is raised to open the heater press 50 vertically. The tube stage 85 is moved to the heater press 50. The lever 83 of the heater press 50 is lowered to tuck the braid fiber 3. While heating in such a state, the tube stage 85 is moved to the left hand side as shown in FIG. 8.

Here, the flared portion 45 of the heater press 50 is trumpet-shaped, and the braid fiber 3 is withdrawn through the trumpet-shaped hole, whereby the braid fiber 3 undergoes heat fusion witheringly, and the hollow fiber 1 undergoes heat shrinkage and will firmly be fixed on the metal pipe 5.

Figure 5G:
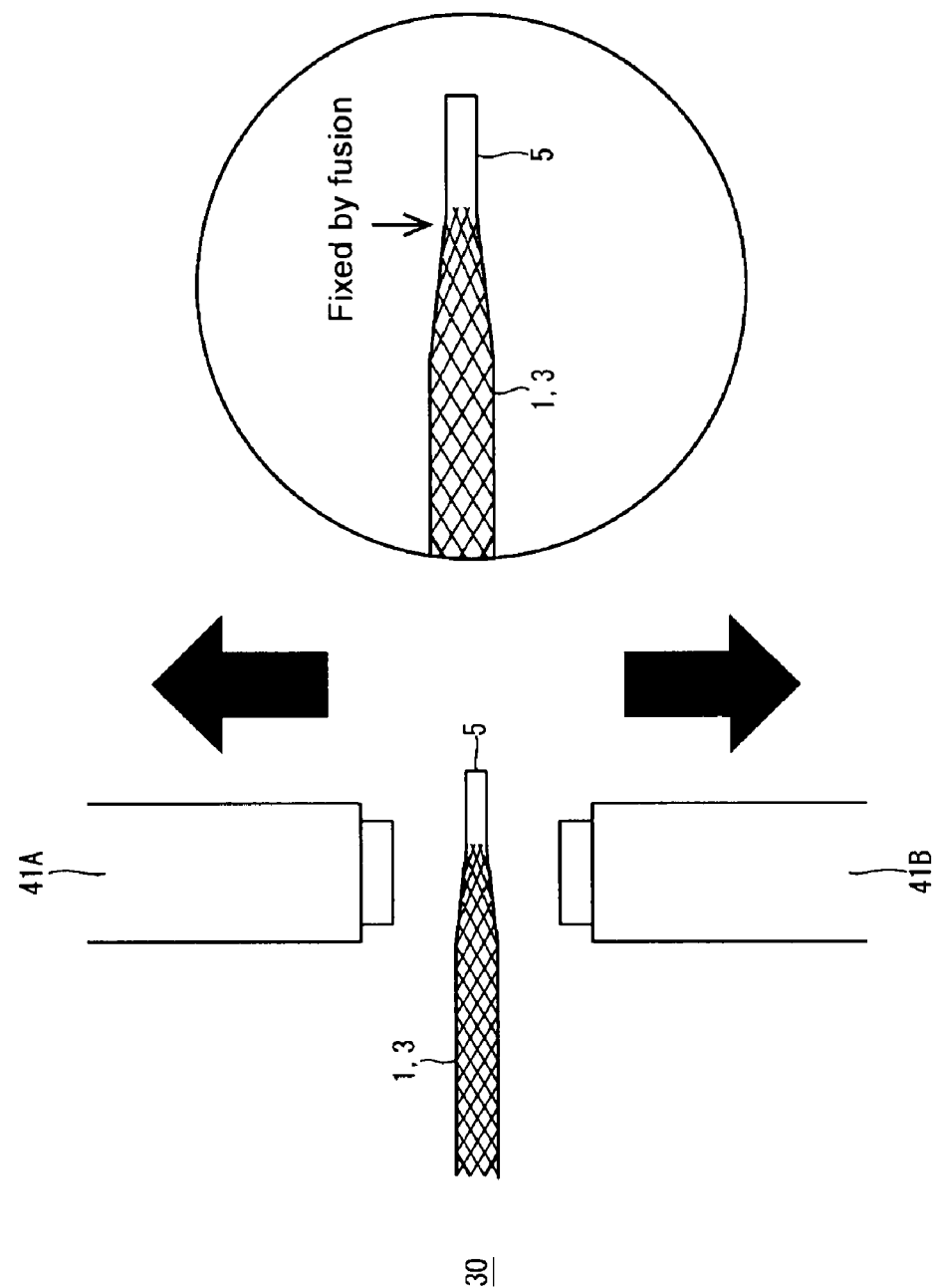
FIG. 5G is a view illustrating a step for producing a moisture control module (step 7).

(7) When a buzzer has sounded (after 25 seconds from the initiation of heating), as shown in FIG. 5G, a lever of the heater press 50 is raised, and the tube stage 85 is pulled. As a result, a braid fiber 3 is fused and free from fraying into 16 yarns, and the hollow fiber 1 is firmly fixed by heat shrinkage on the metal pipe 5 and is free from being detached.

(8) After the heat fusion, a moisture control module 30 is set in a resin mold not shown. At that time, in order to prevent the resin from flowing into the hollow fiber 1, a set pin which meets the inner diameter of the metal pipe 5 is fitted into the end of the tube 5. By a resin (polypropylene) molding machine, the end portion is molded into a joint shape thereby to finish into a tube dryer for exhaled gas.

Figure 5H:
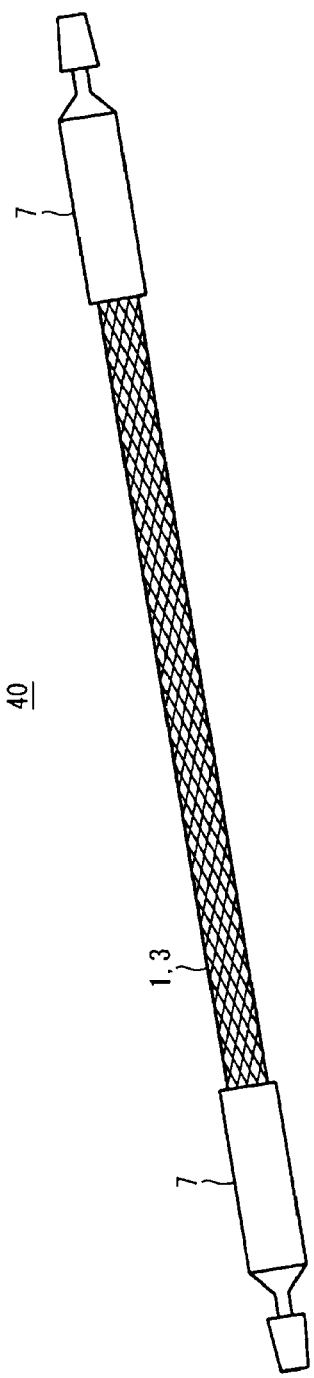
FIG. 5H is a view illustrating a step for producing a moisture control module (step 8).
Figure 6:
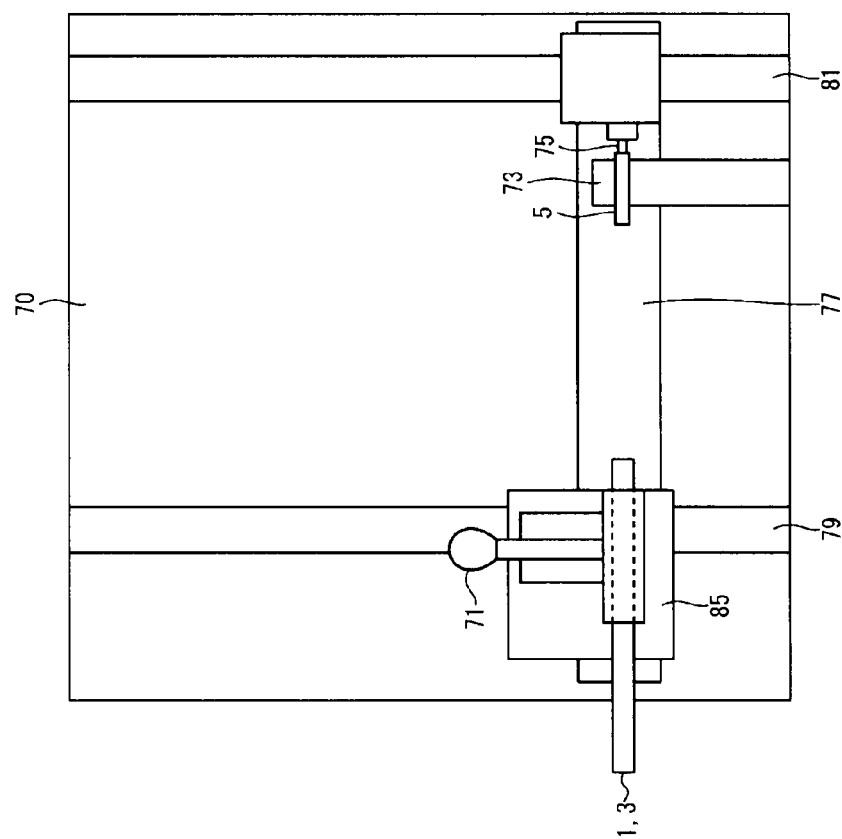
FIG. 6 is a stage overview (stage 1).

By virtue of the heat fusion, the braid fiber 3 is free from fraying into 16 yarns, and the hollow fiber 1 is firmly fixed by heat shrinkage on the metal pipe 5 and is free from being detached, whereby the operation becomes very efficient. The above steps are repeated also with respect to the other end on the opposite side to complete a moisture control module 40 as shown in FIG. 5H.

(9) Then, the air sealing performance of the molded portion was measured by using a leak tester. As the measuring conditions, after hermetically closing the joint portion on one side, a pressure of 0.07 MPa was injected from the other joint side. The leaked amount of not more than 0.3 mL/min. was regarded as "acceptable". The moisture control modules 40 prepared by the heat fusion method of the present invention were all "acceptable".

The entire disclosure of Japanese Patent Application No. 2009-188686 filed on Aug. 17, 2009 including specification, claims, drawings and summary is incorporated herein by reference in its entirety.

What is claimed is:

1. A moisture control module comprising a tubular hollow fiber, a braid fiber plaited into a braid to cover the exterior of the hollow fiber, and a pipe inserted in an end of the hollow fiber, wherein as the hollow fiber and the braid fiber present in a region with a prescribed length from said end have been heated at a prescribed temperature from outside, the braid fiber is fused, and at the same time, the hollow fiber is fixed by heat shrinkage to the pipe.

2. The moisture control module according to claim 1, which is provided with a joint formed to cover the respective ends of the pipe, the hollow fiber and the braid fiber.

3. The moisture control module according to claim 1, wherein the prescribed temperature is from 150° C. to 180° C.

4. A process for producing a moisture control module, which comprises combining a tubular hollow fiber and a braid fiber plaited into a braid to cover the exterior of the hollow fiber; inserting a pipe to an end of the hollow fiber from outside along the axis of the hollow fiber so that a part of the pipe is left to remain outside; and while applying a heat of a prescribed temperature to a region with a prescribed length of the braid fiber from the end by pressing the braid fiber by a heater press, passing the braid fiber through a hole having its diameter gradually or stepwise flared towards the axis direction of the heater press, so that the braid fiber is fused, and at the same time, the hollow fiber is fixed by heat shrinkage to the pipe.

5. An apparatus for producing a moisture control module, which comprises a clamp for clamping a braid fiber plaited into a braid around a tubular hollow fiber; a pipe-inserting means for inserting a pipe to the hollow fiber fixed by clamping by the clamp, from outside along the axis of the hollow fiber so that a part of the pipe is left to remain outside; and a heater press means for heating, while uniformly pressing from circumference, a region with a prescribed length from an end of the braid fiber by letting the region pass through a hole having its diameter gradually or stepwise flared towards the axis direction.

\* \* \* \* \*